April 27, 1954

A. SERNA 2,677,066

DYNAMOELECTRIC MACHINE

Filed Aug. 21, 1952

INVENTOR.
Alex Serna
BY Barthel & Bugbee
Attys

INVENTOR.
Alex Serna
BY Barthel & Bugbee
Attys

April 27, 1954     A. SERNA     2,677,066
DYNAMOELECTRIC MACHINE
Filed Aug. 21, 1952     3 Sheets-Sheet 3
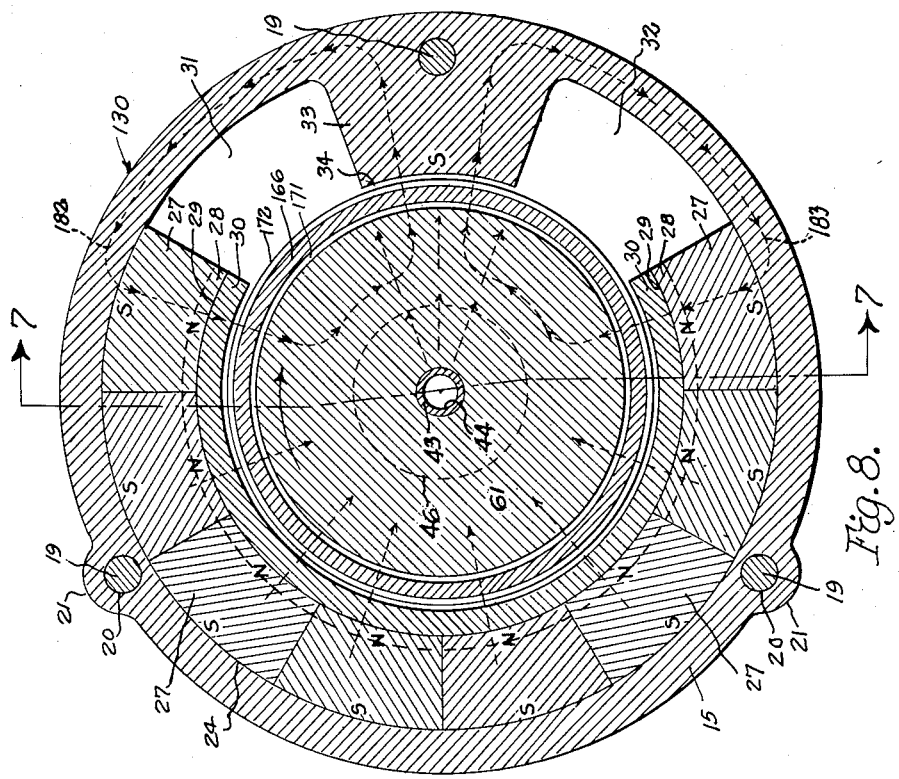
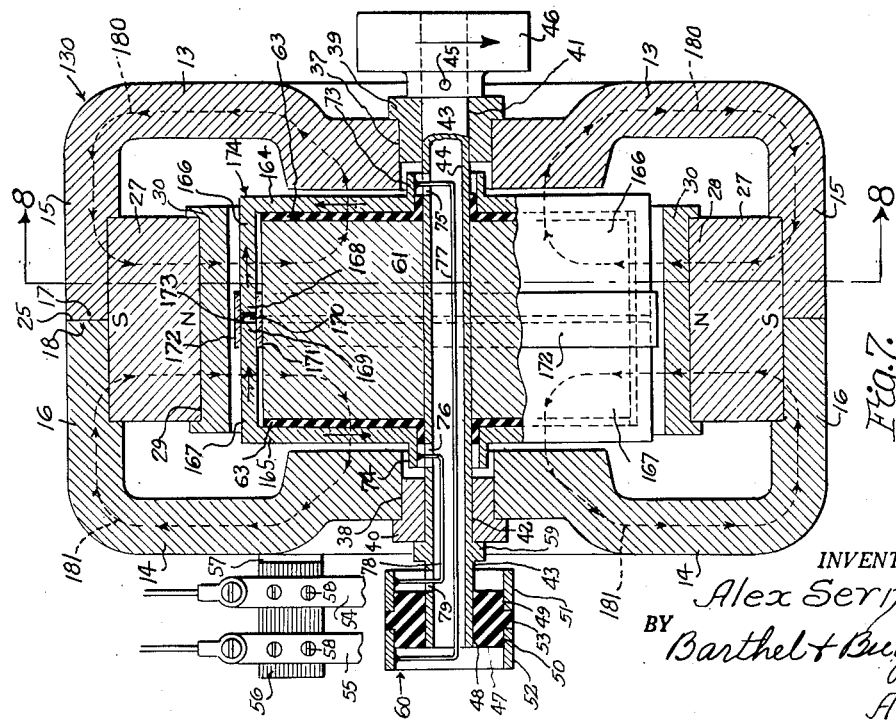
INVENTOR.
Alex Serna
BY Barthel + Bugbee
Attys Patented Apr. 27, 1954

2,677,066

UNITED STATES PATENT OFFICE 2,677,066

DYNAMOELECTRIC MACHINE

Alex Serna, Dearborn, Mich.

Application August 21, 1952, Serial No. 305,591

14 Claims. (Cl. 310—178)

This invention relates to electrical machinery and, in particular, to electric dynamos or motors.

One object of this invention is to provide an electric dynamo wherein current is generated by the rotation, in a magnetic field, of a rotor including a pair of discs separated by a gap containing an ionizable gas, the current thus generated in the discs being caused to flow across that gap when that gap arrives adjacent a reversed-polarity pole piece in the field magnet structure, the current thus caused to flow being taken off by means of collector rings and brushes from the rotor shaft.

Another object is to provide an electric dynamo of the foregoing character wherein the gap consists either of a single annular space between the ends of flanges extending toward one another from the rotor discs or of a multiplicity of individual gaps disposed in circumferentially-spaced relationship around the periphery of the rotor, the gaps or gaps in either case being enclosed within suitable containers so as to imprison and prevent the escape of the ionizable gas in the gap or gaps.

Another object is to provide an electric dynamo of the foregoing character wherein the electrodes on one side of the gap are coated with an electron-emissive material from which a stream of electrons is caused to flow across the gap when the gap arrives adjacent the reversed polarity pole piece of the field magnet structure.

Another object is to provide an electric dynamo of the foregoing character wherein the current induced in the discs elsewhere than adjacent the reversed polarity pole piece opposes and cancels out other current similarly induced but flowing in opposite directions within the discs, this opposing and cancelling flow of current ceasing at the portion of the discs momentarily adjacent the said reversed-polarity pole piece.

Another object is to provide an electric dynamo of the foregoing character wherein the gap or gaps dispense with the brushes otherwise needed to contact the discs in order to take off the current at the peripheries of the discs.

Another object is to provide a modified electric dynamo wherein the rotor contains two or more sets of discs insulated from one another and provided with independent current flow gaps, so as to increase the voltage of the current generated during the operation of the machine.

Another object is to provide an electric dynamo of the foregoing character which can also be used as a motor by supplying current thereto.

Another object is to provide an electric dynamo of the foregoing character wherein the electrically-interconnected stationary brushes engaging the peripheries of a pair of separated discs are eliminated by the use of the reversed polarity pole piece in the gap between the other field magnets, in cooperation with the electronic unidirectional current-conducting devices associated therewith.

Other objects and advantages of the invention will become apparent during the course of the following description of the accompanying drawings, wherein:

Figure 4 is a diagrammatic developed side elevation of the current flow gaps, taken along the arcuate line 4—4 in Figure 2, with the arrows showing the direction of rotation of the rotor and consequent flow of the current when the machine is in use as a dynamo;

Figure 5 is a fragmentary view similar to Figure 3, but showing a modification employing a plurality of discs in the rotor;

Figure 6 is a fragmentary view similar to Figure 3, but with the rotor in elevation, showing a further modification employing a field winding;

Figure 7 is a view similar to Figure 3, but showing a still further modification wherein the rotor discs are cup-shaped so as to provide a single continuous annular gap between the edges of the disc flanges; and Figure 8 is a vertical cross-section taken along the line 8—8 in Figure 7.

It has long been known that when discs of electrically-conducting material are rotated in a magnetic field, electric current is caused to flow in the discs and this current may be taken off by appropriately-located brushes placed in contact with the discs. The brushes, however, in such an apparatus must remain in a fixed location, for if they are moved, the flow of current ceases by reason of opposing currents set up in the discs and cancelling out one another. Due to the mechanical difficulties involved in constructing a dynamo of this kind, practical use of this principle is not easy to achieve.

The present invention, however, eliminates the need for such brushes in contact with the discs and, in contrast, flow of current is effected by providing one or more pairs of discs separated from one another by small gaps having an ionizing gas extending therebetween and having pairs of electrodes, one electrode of each pair being preferably coated with an electron-emissive substance establishing a uni-directional flow of current-carrying electrons during operation of the machine. The current is caused to flow in a circuit enabling it to be taken off by the use of a field pole piece of reversed polarity relatively to the remaining field pole magnets, whereas the currents induced elsewhere in the discs cancel one another out by reason of their opposing nature.

Figure 1:
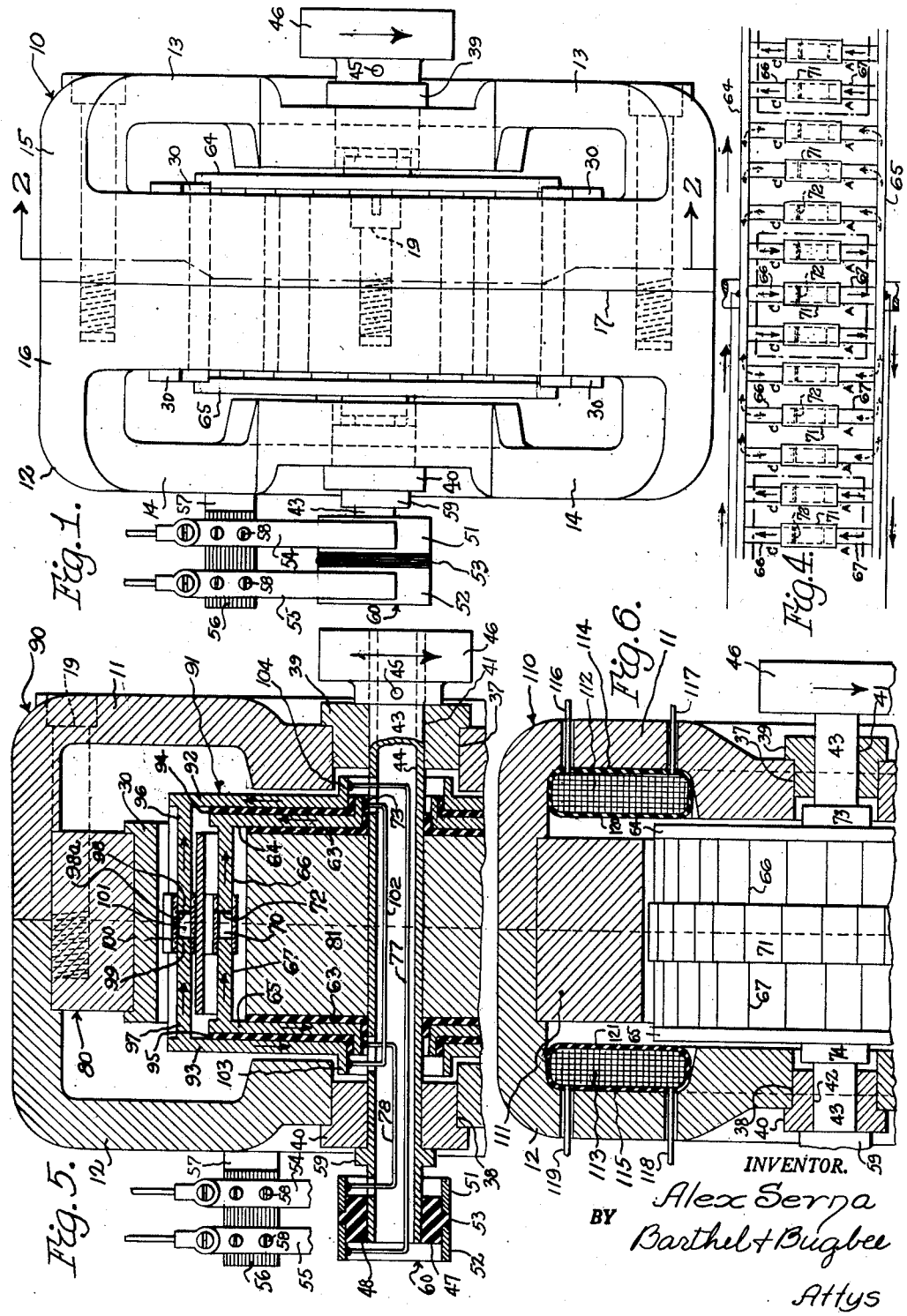
Figure 1 is a side elevation of an electric dynamo or motor, according to one form of the invention.
Figure 2:
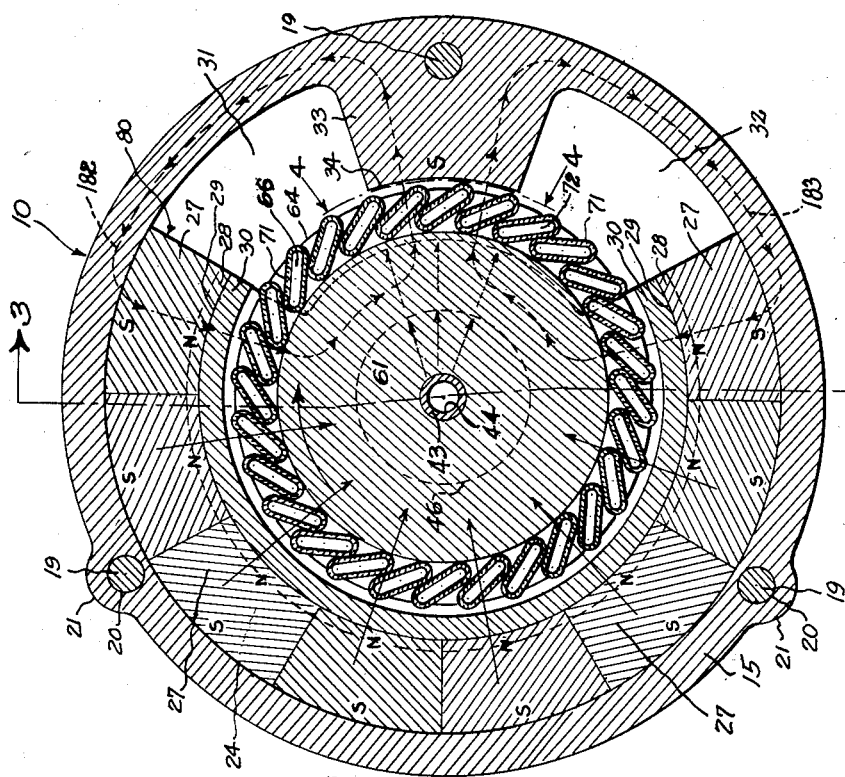
Figure 2 is a central vertical cross-section through the dynamo or motor of Figure 1, taken along the line 2—2 in Figure 1.

Referring to the drawings in detail, Figures 1 to 4 inclusive show a dynamo-electric machine, generally designated 10, constructed according to one form of the invention and which, while preferably used as a dynamo, may also be used as a motor. For the purposes of description, it will be assumed that the machine is to be operated as a dynamo and will therefore be referred to as the dynamo 10. The dynamo 10 is provided with a pair of dished casing halves 11 and 12 (Figure 3) with end plate portions 13 and 14 and peripheral portions 15 and 16 respectively having their adjacent edges 17 and 18 in engagement with one another and held in such engagement by bolts 19 passing through holes 20 in peripheral bosses 21 (Figure 2). The casing halves 11 and 12 are preferably formed from soft iron and are provided with annular recesses 22 and 23 (Figure 3) which in assembly form a partly annular internal groove 24 disposed on opposite sides of the parting line or plane 25 between the two casing halves 11 and 12.

Mounted in the groove 24 in side-by-side abutting relationship are the arcuate outer ends 26 of truncated sector-shaped permanent field magnets 27, the arcuate inner ends 28 of which engage an arcuate partly annular groove 29 in an arcuate retaining member 30. The grooves 24 and 29 extend only partway around the casing halves 11, 12 (Figure 2), leaving a pair of gaps 31, 32 between the endmost magnets 27 and an isolated pole piece 33. The magnets 27 are arranged with their outer ends 26 all of one polarity and their inner ends 28 all of the opposite polarity, whereas the isolated pole 33 at its inner arcuate end 34 has an opposite polarity to the inner ends 28 of the permanent field magnets 27. The isolated pole 33 is of the same general shape as the field magnets 27 but is preferably of the same soft iron as the casing halves 11 and 12, although it optionally may consist of a permanent magnet with reversed polarity relatively to the permanent magnets 27.

Figure 3:
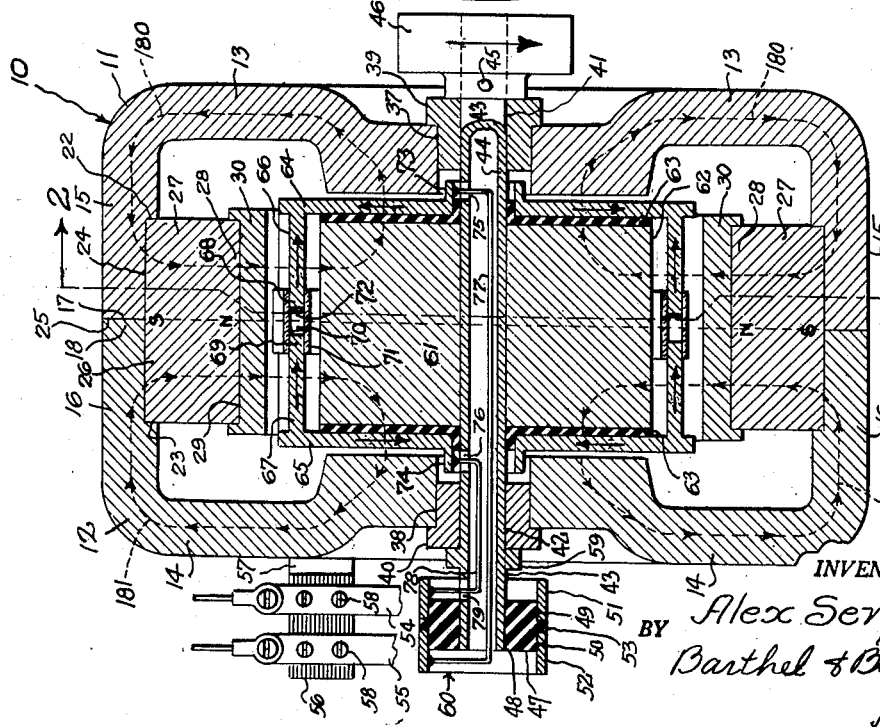
Figure 3 is a central vertical longitudinal section taken along the line 3—3 in Figure 2.

The end plate portions 13 and 14 of the casing halves 11 and 12 are provided at their centers with aligned bores 37 and 38 respectively (Figure 3) which receive bearings 39 and 40 having bearing bores 41 and 42 in which is journaled a hollow shaft 43 having a bore 44 therein. Pinned or otherwise secured as at 45 to one end of the shaft 43 is a pulley 46 whereas mounted on the opposite end thereof and drivingly secured thereto is a disc 47 of insulating material having a bore 48 receiving the shaft 43. The periphery of the disc 47 is grooved or rabbeted as at 49 and 50 to receive collecting rings 51 and 52 of electrically-conducting material such as copper or brass separated from one another by the annular ridge 53 of insultaing material between them. The collecting rings 51 and 52 are engaged by conventional brushes 54 and 55 respectively mounted on the insulated portion 56 of a bracket 57 secured to the casing half 12, the brushes 54 and 55 being held in place by screws 58 (Figure 3). The shaft 43 is provided with an annular enlargement 59 adjacent the end carrying the current collector, generally designated 60, which consists of the assembly of the insulating discs 47 and of collecting rings 51 and 52.

Mounted upon and drivingly secured to the central portion of the shaft 43 between the casing halves 11 and 12 is a drum 61 of soft iron or similar magnetic material, the drum 61 being provided with a cylindrical peripheral surface 62. Mounted on the opposite ends of the drum 61 are centrally-flanged insulating discs 63 which in turn have centrally-flanged rotor discs 64 and 65 of electrically-conducting material such as copper mounted thereon. The discs 64 and 65 at their peripheries are provided with a multiplicity of circumferentially-spaced rod-like electrodes 66 and 67 (Figure 3) projecting toward one another. Each pair of electrodes 66 and 67 have their inner ends 68 and 69 separated from one another by a gap 70, each gap 70 being enclosed in a short tube 71 of insulating material extending over the ends of the electrodes 66 and 67 and filled with an ionizable gas such as argon, neon, krypton, xenon, hydrogen or the like. The electrodes 66 and 67 and tubes 71 are preferably of elongated cross-section, the median planes of which are inclined relatively to the radii of the drum 61 (Figure 2). The ends 68 of the electrodes 66 are also preferably coated with a layer 72 of electron-emissive substance such as caesium (Figures 3 and 4). In place of the gas-filled tube 71, other unidirectional conductors of alternating current rectifying material may be used, for example, selenium, copper-oxide or germanium.

Extending from the centrally-flanger portions 73 and 74 respectively of the rotor discs 64 and 65 through holes 75 and 76 in the shaft 43 are conductors 77 and 78 leading respectively to and connected to the collecting rings 51 and 52 respectively. The conductors 77 and 78 pass lengthwise through the bore 44 in the hollow shaft 43, the conductor 77 emerging at the left-hand end thereof and the conductor 78 passing through a hole 79 near the insulating disc 47. The assembly of the permanent field magnets 27 is generally designated as the field 80. The assembly of the drum 61, insulating disc 63, rotor discs 64, 65, electrodes 66, 67 and tubes 71 is generally designated as the rotor 81.

The modified dynamoelectric machine, generally designated 90 shown in Figure 5 is generally similar in construction and operation to the dynamoelectric machine 10 of Figures 1 to 4 inclusive and similar parts are designated with the same reference numerals. The machine 90, however, is provided with a compound rotor, generally designated 91, which includes the construction of the rotor 81 but has additional centrally-flanged rotor discs 92 and 93 separated from the rotor discs 64 and 65 by centrally-flanged insulating discs 94 and 95 respectively. The outer rotor discs 92 and 93 are preferably of electrically-conducting material, such as copper or brass, and have outer electrodes 96 and 97 extending toward one another and having spaced ends 98 and 99 surrounded and enclosed by insulating tubes 100 similar to the insulating tubes 69 and similarly having gaps 101 filled with an ionizable gas, such as those mentioned above. The end of the electrode 98 is provided with a coating 98a of electron-emissive material similar to the coating 72 on the end of the electrode 66.

The central flange 73 of the inner rotor disc 64 is connected by the conductor 102 to the central flange 103 of the outer rotor disc 93, whereas the central flange 104 of the outer rotor disc 92 is connected to the conductor 77 which runs, as before, to the collecting ring 52 of the current collector 60. The conductor 78 runs from the central flange 74 of the inner rotor disc 65 to the collecting ring 51 as before. The rotor discs 65, 64, 93, 92 are thus disposed in series with one another. The operation of the machine 90 is similar to that of the machine 10 and is described below.

The modified dynamoelectric machine 110 shown in Figure 6 is generally similar to the dynamo electric machine 10 of Figures 1 to 4 inclusive except that in place of the permanent magnets 27 there are provided temporary magnets 111 similarly mounted but of soft iron or other temporarily magnetic material. To magnetize these magnets 111, there are provided opposite field coils or windings 112 and 113 located respectively in annular recesses 114 and 115 in the casing halves 11 and 12 and supplied with electric current through pairs of conductors 116, 117 and 118, 119 respectively, the casing halves 11 and 12 being suitably bored for the passage of these conductors. The coils 112 and 113 are insulated by an insulating coating or layer 120 and 121 respectively. The operation of this form of the invention is also described below and is similar in principle to that of the foregoing forms of the invention. The coils 112, 113, however, are of course energized by a separate source of excitation, the current output voltage being of the order of approximately 20 times the excitation voltage applied to the coils 112 and 113.

The modified dynamoelectric machine 130 shown in Figures 7 and 8 is also similar in construction and operation to the machine 10 of Figures 1 to 4 inclusive and similar parts are likewise similarly designated. In place of the individual multiple electrodes 66, 67 and individual tubes 71 enclosing their ends 68 and 69 and the gap 70 between them, the rotor discs 164 and 165 of Figures 7 and 8 are provided with continuous annular flanges 166 and 167 extending toward one another and having their inner annular edges 168 and 169 separated from one another by a short gap 170 surrounded by and enclosed by inner and outer sleeves 171 and 172 respectively. The electrode ends 168, like the electrode ends 68 of Figure 3, are similarly coated with a layer 173 of electron-emissive material and the space 170 filled with a similar ionizable gas. The rotor, generally designated 174, thus formed is also connected to the current collector 60 in a similar manner to that shown in Figure 3, and the cup-shaped rotor discs 164 and 165 are similarly constructed of current-conducting material such as copper or brass.

The operation of the various forms of the invention as a dynamo is generally the same. In each case, power is applied to the driving pulley 46, such as by a belt driven by a prime mover of any suitable type such as a steam engine, internal combustion engine, gas or steam turbine, and, in the case of the modification 110 of Figure 6, current is also supplied to the field windings 112 and 113. Assuming that the rotor 81, 91, 174 is rotated in a direction indicated by the arcuate arrows, and also assuming that lines of force extend radially inward as shown by the straight arrows in Figures 2 and 8, the consequent cutting of these lines of magnetic force by the rotor discs and their electrodes causes currents to flow therein. These currents, however, are of opposing natures, as indicated by the opposing arrows in Figures 3 and 7, and cancel one another out except at the isolated field pole 33 of reversed polarity. At this location (Figures 2 and 8), the opposing factors are eliminated and the current flows through the electrodes and across the gaps between them, carried by the stream of electrons passing in one direction only across these gaps and through the ionized gas therein. This construction prevents the flow of electricity in the opposite direction across the gaps. The current thus generated in the respective rotor 81, 105 or 174 is conveyed to the collecting rings 51, 52 of the current collector 60 by the conductors 77 and 78 and, in the case of the Figure 5 modification, the conductor 102. The compound construction of the compound rotor 105 in Figure 5, as previously stated, results in the production of a higher voltage than in the simpler forms of rotors 81 and 174.

As shown by the arrows arranged in the orbital paths designated 180 and 181 in Figures 3 and 7, the magnetic flux induces opposing currents in the rotor discs and electrodes respectively, as indicated by the opposing directions of their respective straight arrows therein, whereas in the regions adjacent the isolated field pole 33 of reverse polarity, the magnetic flux as indicated by the arrows 182 and 183 (Figures 2 and 8) is in an orbital path forming a continuous magnetic circuit with radial sides extending through the field pole 33 and resulting, as stated above, in the elimination of the opposing factors at this location. The current flow in the region adjacent the end 34 of the isolated field pole 33 of reversed polarity is shown diagrammatically in Figure 4.

In any of the forms of the invention, the construction and arrangement of the reversed polarity magnetic pole piece 33 in the gap 31 between the opposite ends of the arcuate assembly of field magnets 27, in cooperation with the electronic unidirectional current-conducting devices 66 to 72 inclusive is such that when the rotation of the rotor brings these devices successively in front of the reversed polarity pole 33, the passage of current from one to the other of the discs 64, 65 is favored, whereupon the fixed path thus provided for the current is analogous to the mechanical arrangement of a stationary brush engaging the periphery of each disc, with the brushes interconnected by a stationary metallic link. If desired, a third electrode may be inserted in the gap for control purposes.

What I claim is:

1. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

2. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including an electrode mounted on the periphery of each disc and extending toward the opposite disc, said electrodes extending adjacent one another with a gap therebetween; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

3. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including an electrode mounted on the periphery of each disc and extending toward the opposite disc, said electrodes extending adjacent one another with a gap therebetween and an ionizable gas disposed in said gap; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

4. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including an electrode mounted on the periphery of each disc and extending toward the opposite disc, said electrodes extending adjacent one another with a gap therebetween and an ionizable gas disposed in said gap, one of said electrodes having a layer of electron-emissive material thereon at a location adjacent said gap; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

5. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including a multiplicity of electrodes connected to the peripheries of said discs and extending toward one another with gaps separating their adjacent ends, said electrodes being disposed around the peripheries of said discs in circumferentially-spaced relationship; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

6. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including a multiplicity of electrodes connected to the peripheries of said discs and extending toward one another with gaps separating their adjacent ends, and an ionizable gas disposed in each gap, said electrodes being disposed around the peripheries of said discs in circumferentially-spaced relationship; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

7. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including a multiplicity of electrodes connected to the peripheries of said discs and extending toward one another with gaps separating their adjacent ends and an ionizable gas disposed in each gap, said electrodes being disposed around the peripheries of said discs in circumferentially-spaced relationship, the electrodes connected to one of said discs having layers of electron-emissive material thereon adjacent said gaps; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

8. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a plurality of pairs of discs of electrically-conducting material mounted on said shaft, one pair of said discs being mounted in axially-spaced relationship with the other pair of said discs, a core of magnetic material disposed between said discs, and a unidirectional electric current-conducting device mounted on and electrically interconnecting the peripheries of the axially-spaced pairs of said discs; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

9. A dynamoelectric machine comprising a field magnet structure including a casing of magnetizable material a plurality of magnets having magnetic poles of like polarity disposed in an arcuate path with an interval separating the opposite ends of said path and a field magnet with a magnetic pole of permanently magnetic material of reversed polarity relatively to the polarities of the field magnet structure disposed in said interval, a rotor rotatably mounted adjacent said field magnet structure, said rotor including a shaft, a pair of discs of electrically-conducting material mounted on said shaft in axially-spaced relationship, a core of magnetic material disposed between said discs, and a unidirectional electric current conducting device mounted on and electrically interconnecting the peripheries of said discs; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

10. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a winding disposed adjacent said field magnet structure and adapted to be connected to a source of electric current, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

11. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including approximately cylindrical flanges extending from the peripheries of said discs toward one another with a gap between their adjacent edges; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

12. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including approximately cylindrical flanges extending from the peripheries of said discs toward one another with a gap between their adjacent edges and an ionizable gas disposed in said gap; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

13. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including approximately cylindrical flanges extending from the peripheries of said discs toward one another with a gap between their adjacent edges and an ionizable gas disposed in said gap, one of said edges having a layer of electron-emissive material thereon; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

14. A dynamoelectric machine comprising a field magnet structure including a casing of magnetizable material a plurality of magnets having magnetic poles disposed in an arcuate path in said casing, the opposite ends of said field magnet structure being separated from one another by an arcuate space, an isolated field magnet pole of reverse polarity relatively to the polarities of said field magnet structure disposed in said arcuate space, a rotor rotatably mounted adjacent said field magnet structure and cutting the magnetic field thereof, said rotor including a shaft, a pair of discs of electrically-conducting material mounted on said shaft in axially-spaced relationship, a core of magnetic material disposed between said discs, and a unidirectional electric current-conducting device mounted on and electrically interconnecting the peripheries of said discs, said device including approximately cylindrical flanges extending from the peripheries of said discs toward one another with a gap between their adjacent edges and an ionizable gas disposed in said gap, one of said edges having a layer of electron-emissive material thereon, and a pair of coaxial sleeves of insulating material enclosing said gap and coaxial with said rotor; and a current collector including collector elements mounted on said shaft and electrically connected to said discs and contact members engaging said collector elements for withdrawing therefrom the electric current generated therein, said machine having therein one path of magnetic flux directed inwardly from said magnets to said core, then axially outward in both directions through the discs to the magnetic casing and thence back to the magnets, said machine also having another path of magnetic flux directed inwardly from said magnets to said core and circumferentially in said core to an area opposite said reversed-polarity field magnet pole, then outwardly through said current-conducting device into said reversed-polarity field magnet pole and thence through said magnetic casing back to said magnets.

References Cited in the file of this patent

UNITED STATES PATENTS

| Number | Name | Date |
| --- | --- | --- |
| 339,772 | Hering | Apr. 13, 1886 |
| 1,082,579 | Andrews et al. | Dec. 30, 1913 |